United States Patent
Stemme

[11] 3,746,183
[45] July 17, 1973

[54] HOLDER FOR DISK-SHAPED WORKPIECES IN A PROCESSING POSITION

[75] Inventor: Reimer Stemme, Thun, Switzerland

[73] Assignee: Pierres Holding SA, Bienne/Berne, Switzerland

[22] Filed: Mar. 30, 1972

[21] Appl. No.: 239,512

[30] Foreign Application Priority Data
Apr. 29, 1971 Switzerland.......................... 6335/71

[52] U.S. Cl. ............ 214/1 BV, 198/211, 214/8.5 D
[51] Int. Cl. ............................................ B65g 59/06
[58] Field of Search ................ 214/1 B, 1 BS, 1 BH, 214/1 BV, 8.5 D; 198/25, 210, 211

[56] References Cited
UNITED STATES PATENTS
3,414,959  12/1968  Konazewski...................... 214/1 BV
3,633,731  1/1972  Jones................................ 214/1 BV

*Primary Examiner*—Gerald M. Forlenza
*Assistant Examiner*—George F. Abraham
*Attorney*—Werner W. Kleeman

[57] ABSTRACT

A holder for retaining disk-shaped workpieces in a processing position comprising at least one revolving feed or delivery arm provided at its face confronting the processing position with a protruding suction cup. A stripper bears against the end face of a suction nozzle at the processing position, the workpiece being retained by a suction nozzle against its end face and being positioned by a holding or retaining notch of the stripper. According to important aspects of the invention the stripper is constructed as a resilient arm member and possesses a control surface which is intended to cooperate with a lifting mechanism which revolves in synchronism with the feed arm, this lefting mechanism being angularly rearwardly offset with regard to the direction of revolving motion of such feed arm. The stripper cooperates with the lifting mechanism in such a manner that when the lifting mechanism arrives at the control surface the stripper is resiliently pivoted out of its workpiece holding position and the workpiece is removed by the lifting mechanism out of the processing position.

2 Claims, 3 Drawing Figures

HOLDER FOR DISK-SHAPED WORKPIECES IN A PROCESSING POSITION

BACKGROUND OF THE INVENTION

The present invention relates to a new and improved construction of holder or support for workpieces in a processing position and is of the type incorporating at least one revolving feed or delivery arm equipped at the side confronting the processing position or location with a protruding suction cup and a stripper which bears against the end face of a suction nozzle in the processing position, wherein the workpiece is retained by the suction nozzle against its end face and is positioned by a holding or retaining notch of the stripper.

Devices of this type possess decisive drawbacks when the disk-shaped workpieces should be impinged by laser radiation at the processing position or location. Thus, as is known for such type holders, the workpiece must be non-displaceably retained in the same position relative to the laser during the processing or machining operation, in order that the different surges of the laser beam required to penetrate through the workpiece will always exactly impinge at the same predetermined location of the workpiece. It is for these reasons that efforts were made to avoid all to-and-fro movement at such processing machines and the oscillations which without fail are associated therewith.

Furthermore, these oscillations must be avoided because the machining characteristics of highly precise lasers are extremely sensitive to external disturbacnes, as such are generated by the heretofore known state-of-the-art equipment. It is impossible to carry out mechanical decoupling of the laser from the processing location with its infeed- and withdrawal devices for the workpieces because of the previously required non-displaceable positioning of the workpieces.

Up to the present a cause of these oscillations was always the means serving for ejecting the processed workpieces, such as for instance watch stones, at the processing location. As such, up to the present there have been proposed conventional axial to-and-fro moving ejectors or else, however, intermittent pressure surges, both of which means, by virtue of the oscillations produced thereby, prevented any positive stable supporting of the disk-shaped workpieces at the processing position or location and brought about additional disturbances at the laser and therefore the quality of the work.

Moreover, the heretofore known prior art holders or supports were only capable of accommodating a limited work frequency, wherefore it was impossible to fully utilize the operating frequency of the laser. Finally, these prior art constructions did not afford the possibility of removing at the processing position or location the wastes or residues resulting from the laser machining operation, and which wastes rendered impossible any exact workpiece positioning, and furthermore also did not permit —without impairing the holding force— free access to the laser beam departing from the rear face of the workpiece and thus evaluating such by suitable measurement.

SUMMARY OF THE INVENTION

Hence, from what has been explained above it should be apparent that this particular technology is still in need of a support or holding mechanism for workpieces at a processing location or position which is not associated with the aforementioned drawbacks and limitations of the heretofore known proposals in the art. Therefore it is a primary object of the present invention to effectively and reliably fulfill the existing need in the art through an improved construction of such support or holder for workpieces.

Another and more specific object of the present invention relates to a new and improved support or holder for substantially disk-shaped workpieces, capable of dispensing with the use of the previously employed ejection means, can remove the processed workpiece completley free of jarring or vibrations from the processing position or location, and additionally avoids the aforementioned drawbacks of the previously discussed support constructions of the prior art.

Yet a further significant object of the present invention relates to a new and improved holder for workpieces which is relatively simple in design, extremely reliable in operation, economical to manufacture, and affords a positive supporting action for workpieces or the like free of jarring or vibrations.

Now in order to implement these and still further objects of the invention, which will become more readily apparent as the description proceeds, the inventive holder or support is generally manifested by the features that the stripper is constructed in the form of a resilient arm member and possesses a control surface intended to cooperate with a lifting mechanism revolving in synchronism with the workpiece feed or delivery arm. The lifting mechanism is angularly rearwardly offset with respect to the direction of revolving motion of such feed arm, and wherein the cooperation between the lifting mechanism and the feed arm is such that when the lifting mechanism arrives at the control surface the stripper is resiliently rocked or pivoted out of the holding or support position and the workpiece is removed from the processing location by the lifting mechanism.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
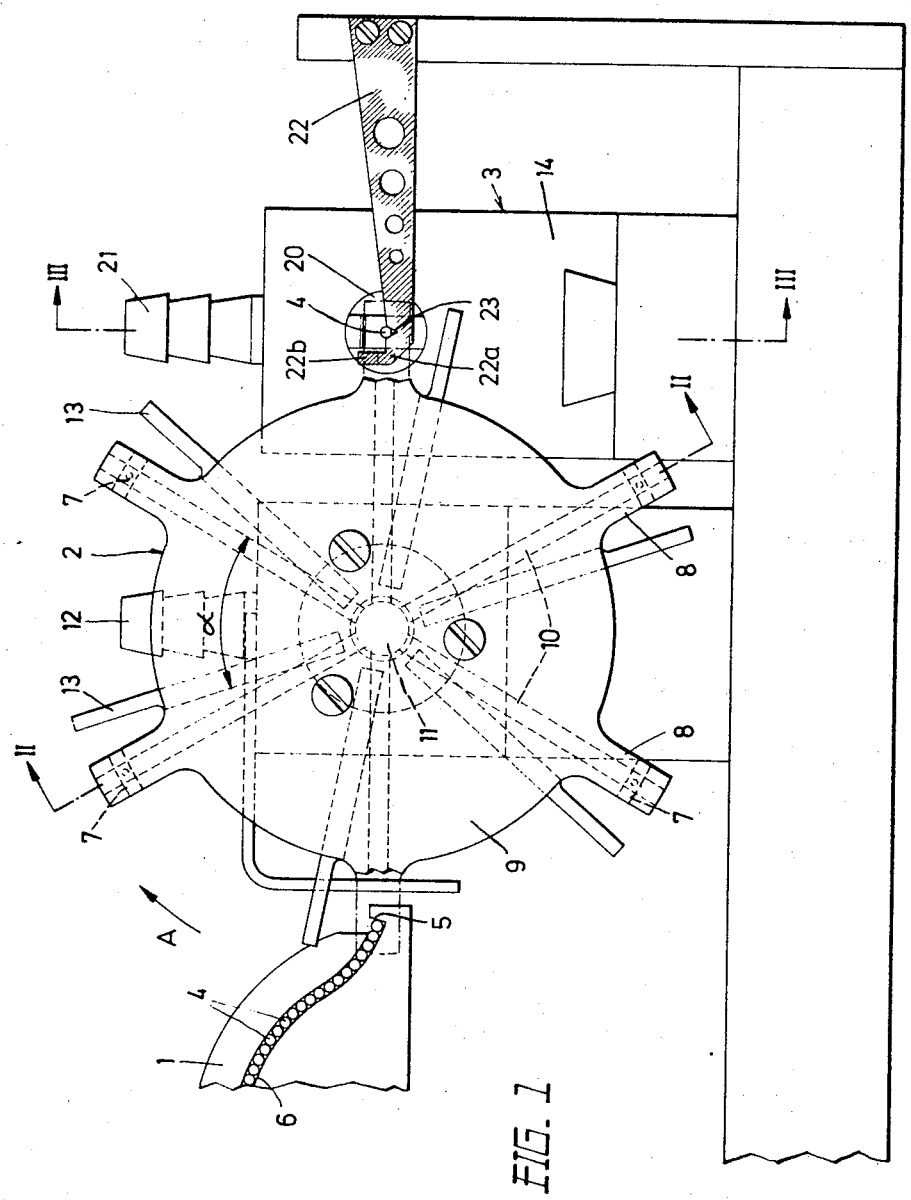
FIG. 1 is a schematic front view of a feed apparatus for workpieces including the support or holder for disk-shaped workpieces.
Figure 3:
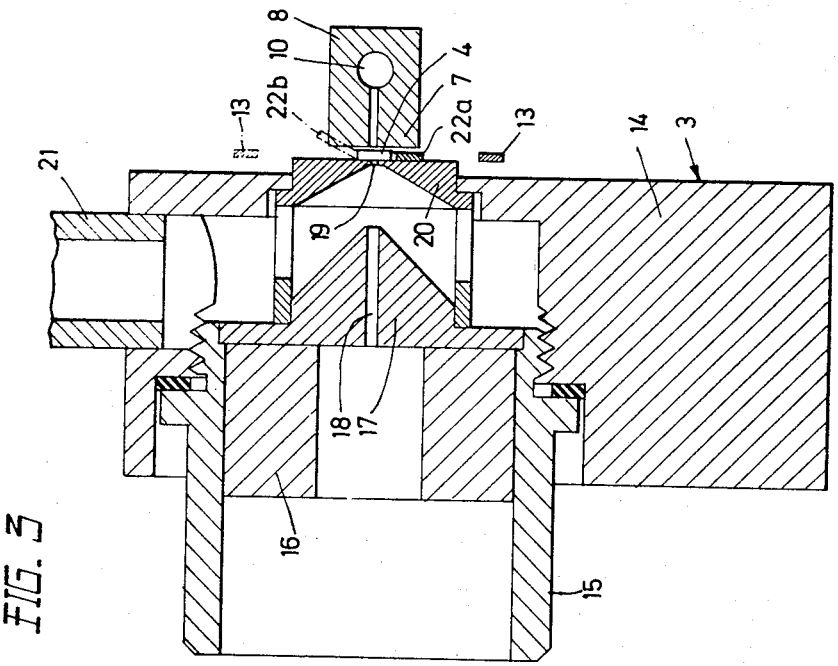
FIG. 3 is an enlarged sectional view of the construction of FIG. 1, taken substantially along the line III—III thereof.
Figure 2:
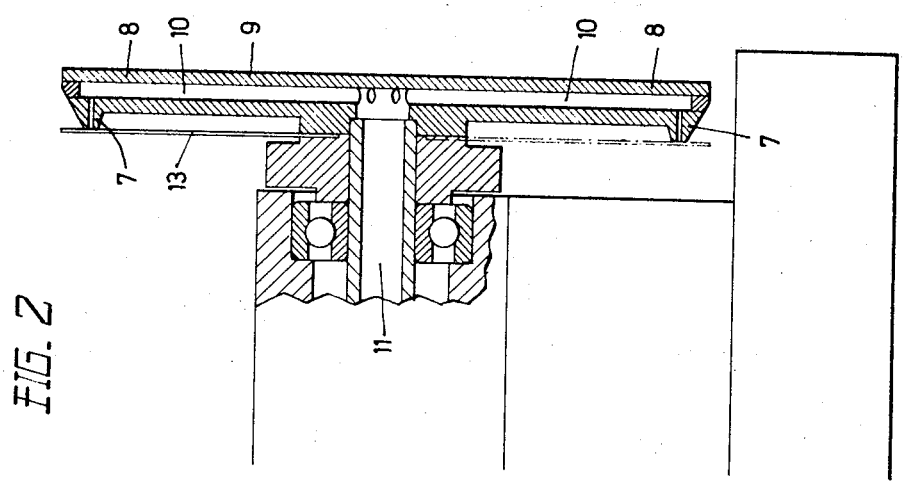
FIG. 2 is a cross-sectional view of the construction depicted in FIG. 1, taken substantially along the line II—II thereof.

The feed apparatus depicted in FIG. 1 will be understood to comprise three main components, namely the feed magazine 1, the workpiece conveying or feed mechanism 2, and finally the holder or support mechanism 3. The disk-shaped workpieces 4 intended to be processed or machined arrive individually at a removal location 5 at the lower end of a magazine channel 6, therefore are positioned at the path of movement of the radilly protruding delivery or feed arms of a uniformly rotating delivery or feed disk 9. These protruding feed arms 8 are provided at each of their ends with a protruding suction cup 7 or equivalent structure. As readily seen by referring to FIG. 2 all of the suction cups 7 of the feed arms 8 are connected via radial conduits 10 and hollow shaft 11 through the agency of the connection or stud 12 with any suitable and therefore not particularly illustrated source or negative pressure. Consequently, during such time as a suction cup 7 wipingly moves past the magazing channel 6 the lowermost workpiece located thereat will be sucked-up and further transported or conveyed. Radially protruding resilient lifting members 13 are secured to the delivery or feed disk 9, and one such respective lifting member 13 is associated with each feed arm 8. Moreover, viewed in the direction of revolving movement of the feed arm members 8, as indicated by the arrow A of FIG. 1, each such associated lifting member 13 is rearwardly offset through a certain angle $\alpha$.

Considering now the support or holder mechanism 3 it will be understood that at the rear of the housing or frame 14 there is threadably connected a hollow sleeve or bushing 15 into which there is inserted a substantially ring-shaped permanent magnet 16. Sleeve or bushing 15 is closed towards the front by a centering member 17 equipped with a throughpassage channel 18 for the laser beam. A suction opening 19 of a suction nozzle 20 is arranged coaxially with respect to channel 18, suction nozzle 20 being operatively coupled via the connection stud or connection means 21 with a non-illustrated negative pressure source.

The free end 22a of a stripper 22 constructed as a resilient arm member resiliently bears against the end face of the suction nozzle 20. The upper edge of the stripper 22 is equipped with a holding notch or groove 23 constructed and arranged in a manner that a disk-shaped workpiece 4 which is fixedly sucked-up at a feed arm 8 will be stripped away from the relevant suction cup 7 and retained in an exact processing position by the holding or support notch 23. Accordingly, the processing position is defined, on the one hand, by the end face of the suction nozzle 20 and, on the other hand, by the sidewalls of the V-shaped holding notch 23. The free end 22a of the stripper 22 is upwardly flexed at its extreme end and possesses an inclined ascending control surface 22b. The relative position between the stripper 22 in the illustrated holding position and the feed disk 9 and the therewith secured lifting members 13 is chosen such that these lifting members 13, during rotation of such feed disk 9, arrive at such control surface 22b, and during such time as they are in contact with the control surface 22b pivot such stripper 22 out of its holding position to such an extent that the workpiece 4 located in its processing position is only still retained by the suction nozzle 20. After having pivoted or rocked the stripper 22 the lifting members laterally arrive at the disk-shaped workpiece 4 and displace such out of the operable zone of the suction nozzle 20 for such length of time until such workpiece drops-off by its own inherent weight.

The return of the absent stripper 22 is accelerated by the magnetic field of the magnet 16 exerting a pulling force upon the absent stripper 22 so that such, not only by virtue of its resilient force, rather additionally owing to the magnetic force, again returns in an accelerated fashion back into its holding or support position in which it is now again capable of stripping the workpiece from the next workpiece delivery or feed arm member 8 which wipingly moves therepast and thus to bring such workpiece into the proper processing position.

In this manner it is possible, while dispensing with every type of to-and-fro movement, to not only bring the disk-shaped workpieces into the proper processing position or location, but rather also to remove such therefrom, to maintain the time for this operation so as to be shorter than the recovery time for the laser beam between two processing steps, to automatically clean the processing location and to provide for a free throughpassage behind the processing location.

While there is shown and described present preferred embodiments of the invention, it is to be distinctly understood that the invention is not limited thereto but may be otherwise variously embodied and practiced within the scope of the following claims.

Accordingly What is claimed is:

1. A holder arrangement for retaining substantially disk-shaped workpieces in a processing location, comprising at least one revolving feed arm provided at the side thereof confronting the processing location with a protruding suction cup, a suction nozzle having an end face, a stripper having a holding notch and bearing against the end face of the suction nozzle in the processing location, the workpieces being retained by the suction nozzle against its end face and positioned by said holding notch of the stripper, said stripper being constructed in the form of a resilient arm member having a control surface, a lifting member arranged angularly rearwardly offset with respect to said feed arm and the direction of revolving motion thereof and rotating in synchronism with respect to said feed arm, said control surface of said stripper cooperating with said lifting mechanism such that when said lifting mechanism arrives at said control surface said stripper is resiliently rocket out of its workpiece holding position and the workpiece is removed from the processing location by the lifting mechanism.

2. The holder arrangement as defined in claim 1, further including a substantially ring-shaped magnet arranged rearwardly of said suction nozzle and substantially coaxially with respect thereto.

* * * * *